United States Patent [19]

Miller, deceased et al.

[11] 4,162,682

[45] Jul. 31, 1979

[54] PIVOTAL SECTIONALIZED WALL FOR HOG RAISING ENCLOSURE

[76] Inventors: Wayne K. Miller, deceased, late of Ord, Nebr.; by Sharon Miller, executrix, 418 S. 17th. St., Ord, Nebr. 68862

[21] Appl. No.: 872,107

[22] Filed: Jan. 25, 1978

[51] Int. Cl.² .............................................. A01K 1/00
[52] U.S. Cl. ........................................ 119/16; 49/340; 49/371; 119/20
[58] Field of Search ................ 119/19, 20, 21, 22, 119/15, 16, 17, 18, 50; 49/371, 340, 168; 52/71, 64

[56] References Cited
U.S. PATENT DOCUMENTS

| | | | |
|---|---|---|---|
| 3,256,640 | 6/1966 | Schnur | 49/371 |
| 3,951,336 | 4/1976 | Miller et al. | 119/16 |

*Primary Examiner*—Jay N. Eskovitz
*Attorney, Agent, or Firm*—LeBlanc & Shur

[57] ABSTRACT

A sectionalized, pivotal wall for an enclosure is described. The wall consists of three horizontally extending sections supported by a frame. In a closed position, the three sections are contained in a common vertical plane. The upper section is pivotally mounted, about its upper horizontal edge, on a supporting frame, and drive means carried by the frame is provided for outward pivotal movement thereof, selectively, to an angle of up to about 90° to the vertical. The intermediate and lower sections are hingedly interconnected at the lower and upper edges, respectively, and are also supported at the ends thereof by the frame. Retaining means are provided on both the intermediate and lower sections for retaining said sections in a closed position, or individually, in an open position wherein one section is rotated outwardly about the hinge, 180° to overlie the other section. The wall is preferred for use in constructing hog raising enclosures.

10 Claims, 9 Drawing Figures

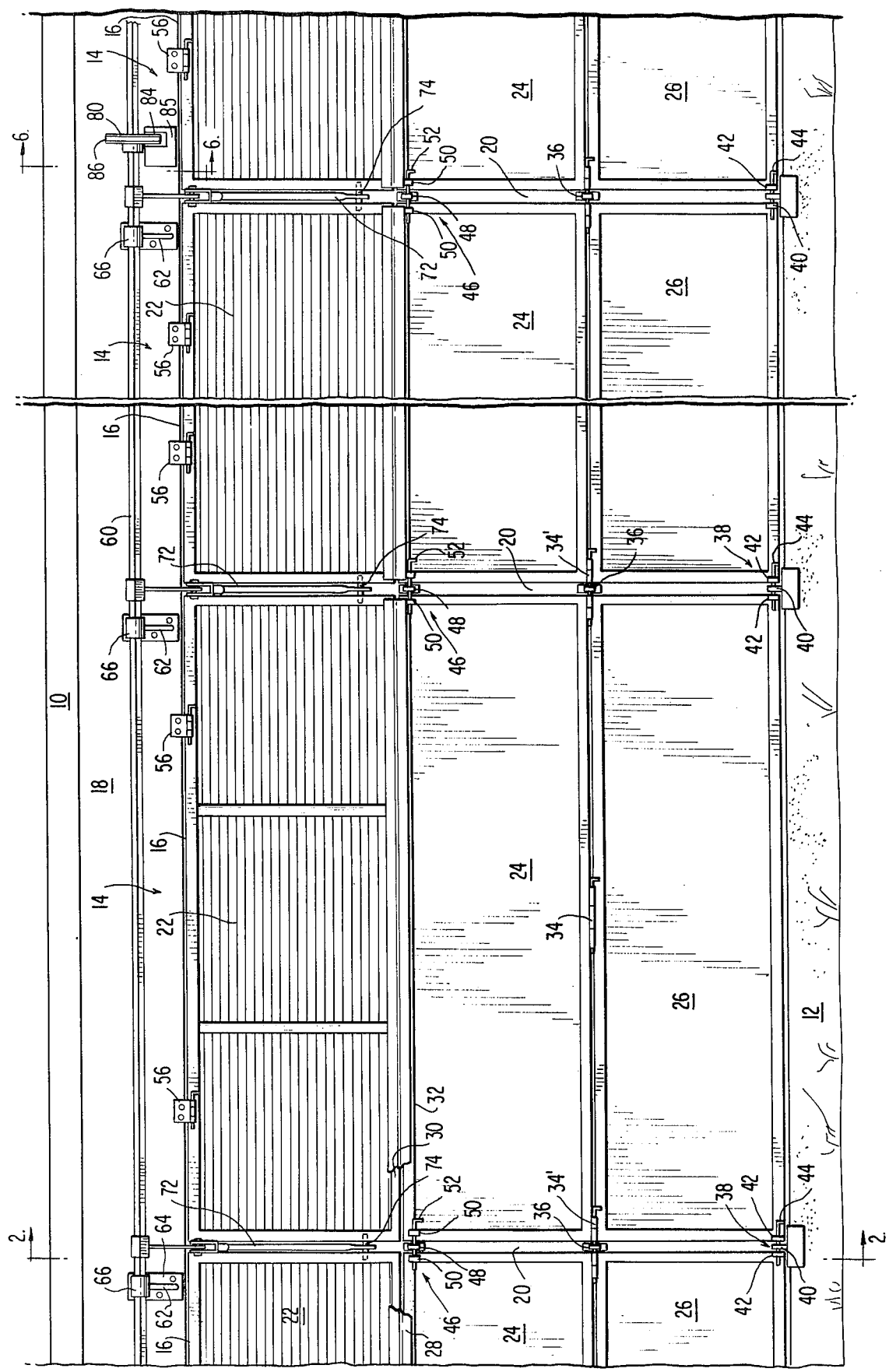

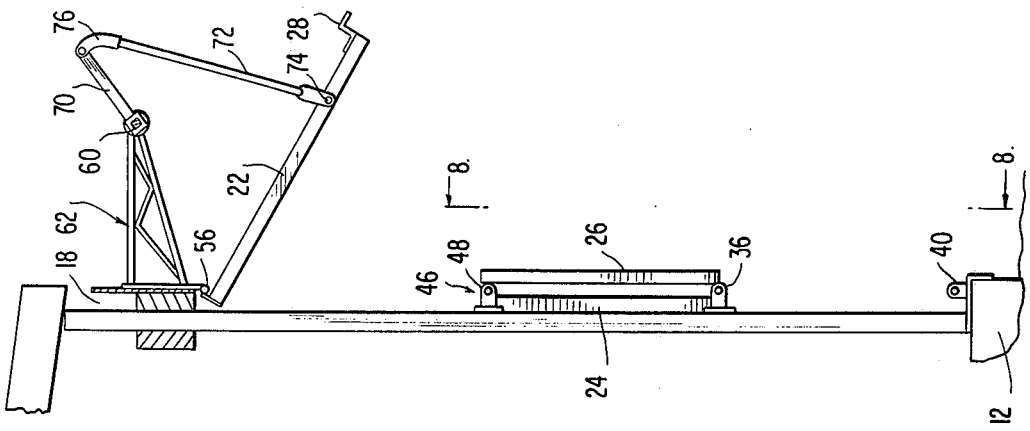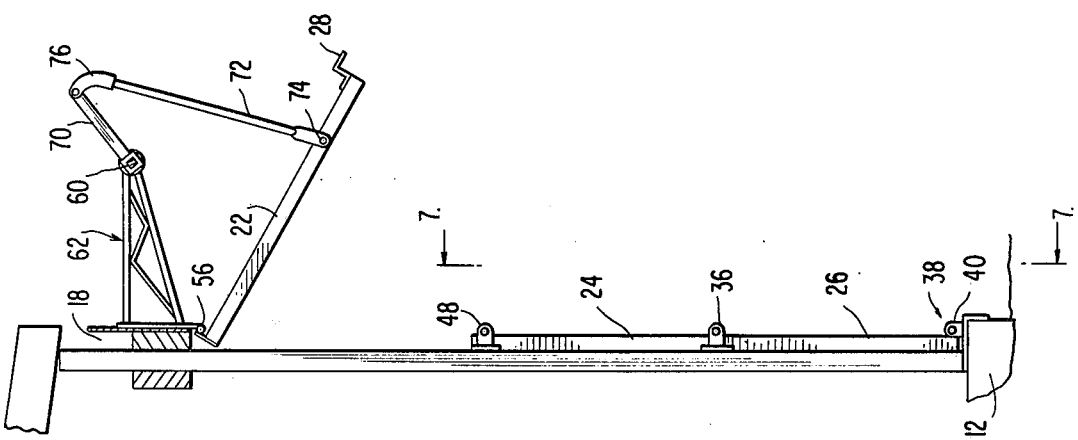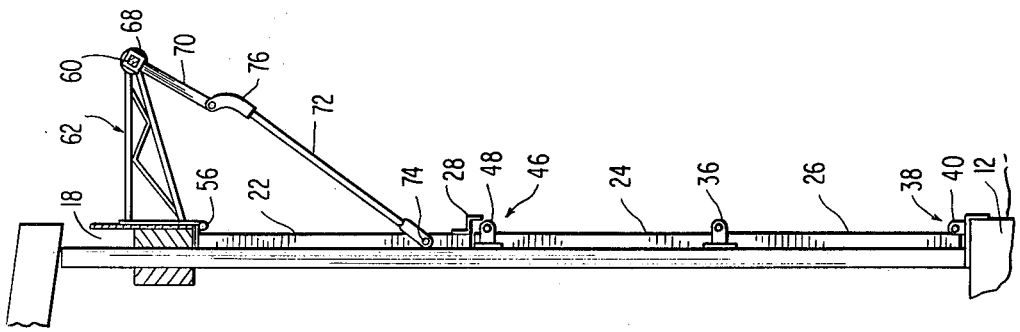

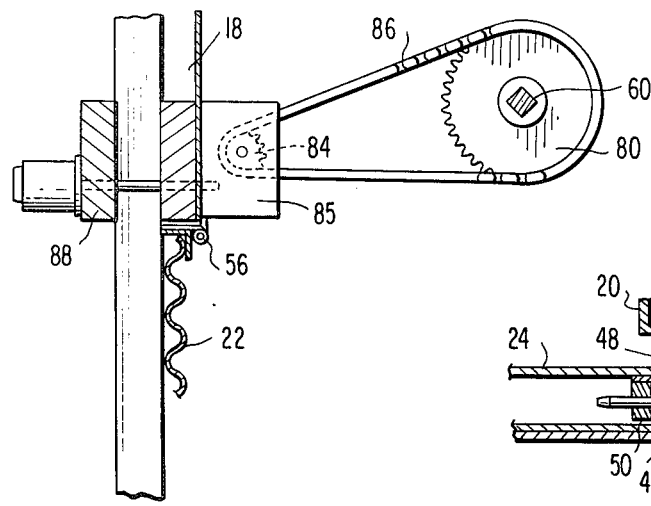
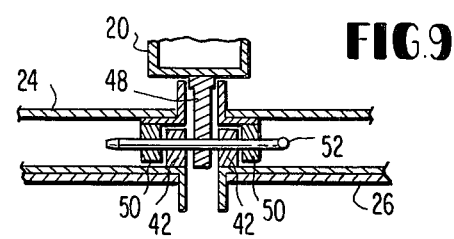
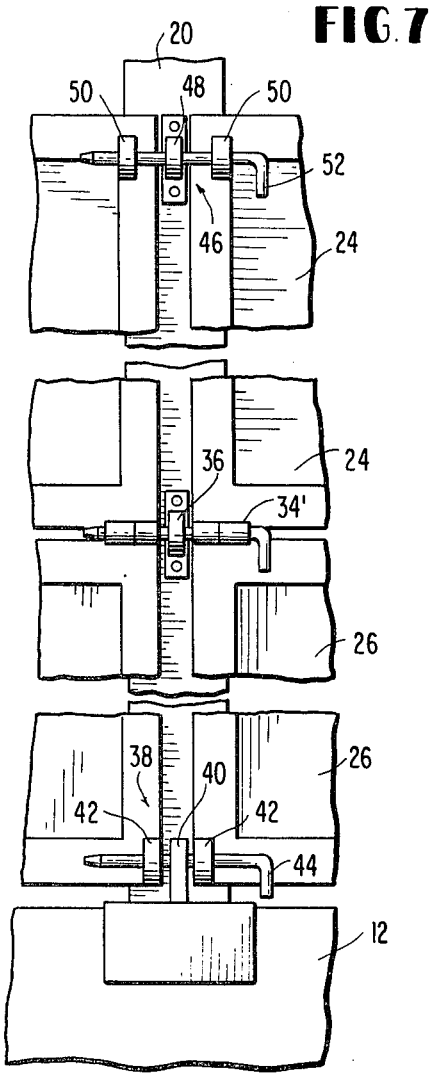
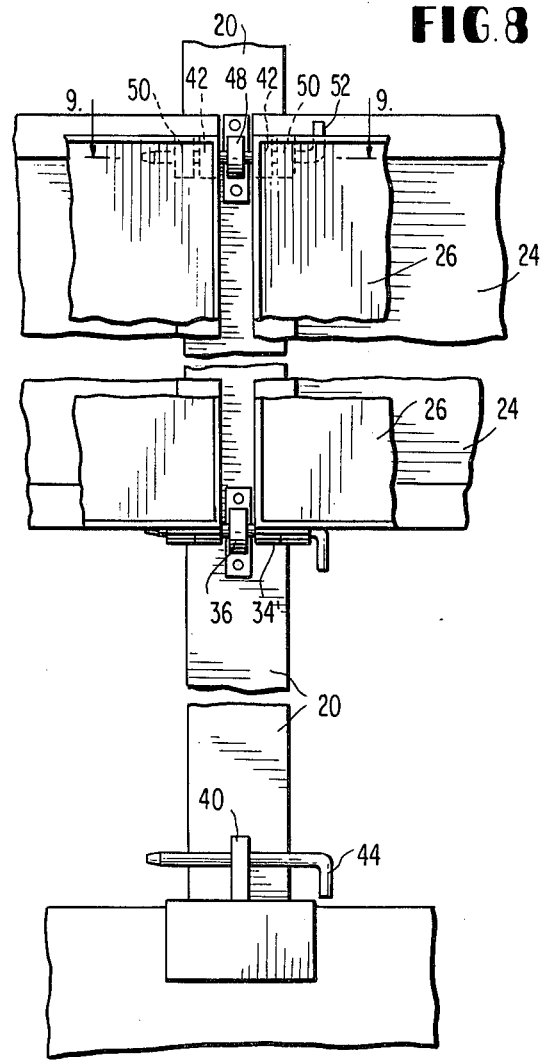

PIVOTAL SECTIONALIZED WALL FOR HOG RAISING ENCLOSURE

This invention relates to wall construction, and in particular to a sectionalized pivotal wall useful in construction of enclosures or houses for raising hogs in confined quarters.

Increasingly, in recent years, hogs are being raised in confined quarters with only a few animals in each of many covered enclosures. The controlled living conditions possible in such an environment have been found to produce a superior grade of animal. However, large hog raising operations necessarily will require a great many of such enclosures. Moreover, the enclosures must be substantial in construction to protect the animals from the elements, and to withstand normal wear caused by the enclosed animals.

It is a usual practice to combine many of such hog raising enclosures under a common roof in a side by side relationship wherein adjacent enclosures are separated by common side walls. Such structures then have the depth of a single enclosure, with a frontage of 15, 20, or more of such enclosure units under a common roof. With such prior structures, providing ventilation and access for feeding and the like can involve the manual labor of many persons merely to rapidly open one or more conventional ventilation openings, or doors, in each enclosure or to close the vent openings in the event of a storm or cold weather.

Accordingly there remains a need for a wall structure that is particularly suited to enclosures for raising animals, such as hogs. Such a wall structure should be easily opened either for ventilation or for access, or for ingress or egress of the animals. This structure should also be secure with vents that may be closed in the event of cold or inclement weather.

It has been discovered that the foregoing may be achieved in a paneled structure of this invention. The structure of this invention uses three elongated, pivotally mounted panel sections supported by an interior frame, which sections form an exterior vertical wall for an enclosure preferably utilized to raise hogs. The longitudinal axis of each of the three panels extends in a horizontal direction and each is pivotally mounted about a hinge connection at a horizontal edge. In a closed position, the three panels lie in a common vertical plane, one above the other, in an abutting relationship.

The uppermost panel is preferably constructed of corrugated fiberglass, and may be raised or lowered for ventilation and to serve as an awning, as needed. Drive means is provided whereby the upper panel and, in a preferred embodiment adjacent uppermost panels of adjacent walls may be simultaneously opened, and maintained in an open position, or closed. In this embodiment, a row of enclosures under a common roof may be ventilated by opening the uppermost panels thereof with a minimum of physical effort through the common drive system of this invention as will be subsequently explained.

The drive means includes a square shaft spaced above and outwardly of the upper most panel. The shaft extends horizontally along the entire frontage of adjacent walls. The lower portion of each uppermost panel is connected to the shaft by a yoke linkage including a lever and connecting rod so that rotational movement of the shaft toward the structure will be translated through the linkage to the panel sections to rotate the sections outwardly about the hinge connection between the supporting frame and the longitudinal upper edge of the section.

The shaft in turn is rotated by a chain drive through sprocket wheels mounted at regular intervals therealong. Each of said wheels is driven by a winch connected thereto by an endless chain. Each winch may be hand operated, manually, by a crank handle or the winch may be motor driven. Typically, the shaft will be rotated, raising the uppermost panel sections until said panel sections are at a desired angle to the vertical. The winch is then stopped and locked in place. To close the sections, the procedure is reversed. The uppermost panel sections may be raised until said sections are nearly perpendicular to the vertical wall. In the alternative, the panel sections may be raised until the panels form an acute angle with the vertical wall whereby the interior of the enclosure may be ventilated, and the panel may serve as an awning.

The lower and intermediate panels are preferably constructed of masonite board. The panel sections are hingedly interconnected at their adjacent longitudinal edges, but are separately mounted at their vertical edges to the vertical supporting frame members, by releasable locks. Therefore, either panel may be unlocked and rotated outwardly about its hinge 180° to rest against the other panel. The locks may also be engaged thereto to stabilize the panel in an open position.

The intermediate panel may then be opened manually for access to the enclosure or for ventilation. In the alternative, the lower panel may be rotated to an open position and locked in place for ingress or egress. The height of the lower panel will be sufficient to permit a hog to pass through the wall of this invention when said panel has been rotated to an open position. Similarly, when the intermediate panel has been rotated to an open position, the height of the closed lower panel will be sufficient to keep an animal such as a hog enclosed within the structure.

Accordingly, it is an object of this invention to provide a sectionalized pivotal wall structure for an animal raising enclosure.

It is another object to provide a wall for each of a plurality of animal raising enclosure constructions disposed side by side under a common roof, a portion of which wall may be rapidly opened for ventilation or closed to secure the interior from adverse weather conditions.

It is another object of this invention to provide a wall structure for a hog raising enclosure of durable construction which may be opened or closed to ventilate the interior or secure the interior against the elements with a minimum of physical effort.

It is yet another object to provide a sectionalized, pivotal wall having three sections, the upper section of which may be opened and held in a position at an acute angle with the vertical to serve as an awning.

It is still another object of this invention to provide a sectionalized pivotal wall for a hog raising enclosure having three horizontal sections, the lower two of which may alternatively be opened to provide either access to the interior of the structure for feeding, ventilation, and the like, or ingress or egress for animals housed in the enclosure.

These and other objects will become readily apparent with reference to the drawings and following description wherein:

FIG. 1 is a front view of a plurality of walls of this invention having portions removed to illustrate side by side wall constructions of this invention.

FIG. 2 is a cross-sectional view of the wall of this invention taken along line 2—2 of FIG. 1.

FIG. 3 is a cross-sectional view of the wall of FIG. 2 showing the uppermost panel in an open position.

FIG. 4 is a view similar to FIG. 3 but illustrating the uppermost and intermediate panels in an open position.

FIG. 5 is a view similar to FIG. 3 but illustrating the uppermost and the lower panels in an open position.

FIG. 6 is a fragmentary cross-sectional view taken along line 6—6 of FIG. 1.

FIG. 7 is a fragmentary front view taken along line 7—7 of FIG. 3.

FIG. 8 is a fragmentary front view taken along line 8—8 of FIG. 5.

FIG. 9 is a fragmentary cross-sectional view taken along line 9—9 of FIG. 8.

With reference to the drawings and in particular to FIGS. 1 and 2, the device of this invention is an outside wall for a hog raising enclosure. As shown in FIG. 1, the enclosure typically consists of a common roof 10 and a common foundation 12 with enclosures 14 disposed in a side by side relationship to each other. The enclosure 14 would be identical and each would have a wall 16 of this invention as will be subsequently explained.

Each wall 16 extends between a horizontal head 18 which supports the roof 10 and the foundation or floor 12. Vertical posts 20 separate adjacent walls 16.

Each wall 16 is formed by horizontal panel sections. The uppermost panel section 22 preferably is constructed of corrugated fiberglass. The intermediate panel 24 and the lower panel 26 may be formed of a construction material such as masonite, if desired. A draft restrictor 28 is mounted on the lowermost edge 30 of the upper panel 22 to overlap the uppermost edge 32 of the intermediate panel 24 when said panels are in the closed position shown in FIG. 2.

As shown in FIGS. 1 and 7, the abutting horizontal surfaces of intermediate panel 24 and lower panel 26 are interconnected by hinges 34 and 34'. Hinge 34 is disposed centrally along the abutting horizontal edges of said panels. Hinges 34' however are disposed to connect the end portions of said edges, and to extend to interconnect adjacent panels for adjacent walls. Hinges 34' are further mounted on vertical posts 20 by staple members 36. It will be obvious to those skilled in the art that the disposition of the hinges 34 and 34' shown in FIG. 1 is merely a preferred embodiment, and alternate spacings or types of hinges or means for mounting said walls on the vertical posts 20 could be provided within the scope of this invention.

A latching mechanism 38 is provided at each lower corner of the panel 26. In the preferred embodiment of this invention, a staple member 40 is mounted at the base of the vertical post 20 and eye members 42 are mounted at the lowermost corners of the panel 26. A removable pin 44 then extends through the eye members and staple members to lock panel 26 in a closed position. Because pin member 44 is slidable in eye members 42 and staple member 40, the pin member may be readily removed in order to manually raise panel 26 to the position shown in FIGS. 5, 8 and 9.

Similarly, a locking mechanism 46 is provided at each uppermost corner of intermediate panel 24. Locking mechanism 46 includes a staple member 48 mounted on the vertical post 20, and an eye member 50 mounted in each of the upper most corners of said panel. A pin member 52 slidably received in members 50 and 48 serves to lock the panel 24 in a closed position as shown in for example FIG. 3. However, removal of pins 52 will permit the panel 24 to be moved manually into an open position as shown in FIG. 4 by rotation about hinges 34 and 34'. In this instance however, the uppermost panel 22 would have to be open slightly to permit the uppermost edge 32 of panel 24 to clear the angle member 28 normally overlapping said edge when the wall of this invention is in a closed position.

The uppermost panel 22 is hingedly attached by hinges 56 to a conventional header 18. Header 18 supports the conventional roof trusses (not shown) which in turn support roof 10. Panel 22 then rotates outwardly to the position shown in FIGS. 3-5 by movement about hinges 56.

The invention includes a drive means for raising and lowering the uppermost panel 22 from for example the closed position of FIG. 2 to the open position of FIG. 3. As shown in FIG. 1, a shaft 60 extends horizontally above the panel 22. As shown in FIGS. 2-5, the shaft is supported by an arm 62 which in turn is attached to header 18 by a mounting plate 64. Shaft 60 is rotationally received within a sleeve 66 so that said shaft is free to rotate therewithin. As shown in FIG. 1, a plurality of said mounting arms 62 are utilized to support shaft 60 and are mutually spaced along the header 18 which supports roof 10.

In the preferred embodiment of this invention, adjacent panels 22 are lifted simultaneously by rotation of shaft 60. Preferably, each vertical edge of each panel 22 is linked to shaft 60 whereby rotational motion of shaft 60 will be translated through said linkage to rotate panel 22 about hinge 56. With attention to FIGS. 2-5, the linkage utilized to raise and lower panel 22 includes a square bushing 68 mounted on shaft 60. A lift arm 70 is attached to an end thereof to bushing 68. A connecting rod 72 is affixed preferably by a pin 74 to the vertical edge of panel 22. As shown in FIG. 1, a common pin 74 may extend between adjacent panels 22 so that adjacent panels are simultaneously raised. Lift arm 70 and connecting rod 72 are interconnected by a yoke 76. Preferably, the linkage will function so that panel section 22 may be rotated about hinge 56 into an angle with the vertical, up to about 90°. In most instances, however, the panel will only be opened into and forming an acute angle as shown in FIG. 3-5 with the vertical.

With reference to FIG. 6, the drive means for rotating the shaft 60 preferably includes a sprocket wheel 80 fixably mounted within a housing 84 which in turn is mounted on the header 18. Drive sprocket 84 and the driven sprocket wheel 80 are interconnected by an endless chain 86.

As will be obvious to those skilled in the art, the means for driving sprocket 84 and in turn for rotating shaft 60 may be a manual winch, crank, or the like (not shown) or the device may be driven by a motor 88. In the event a large number of panels 22 are to be raised by rotation of shaft 60, it may be desirable to provide a plurality of said drive sprockets manually spaced along the shaft 60, each connected to a driving means as shown in FIG. 6. The driver 88 includes a conventional lock or dog (not shown) to hold panel 22 in a desired position, by locking shaft 60 against rotation.

To summarize, the sectionalized pivotal wall of this invention may function as a secure enclosure, or may, optionally, be opened to ventilate the interior or to provide ingress or egress. The wall of this invention is preferred to be utilized in a hog raising enclosure whereby a lower panel may be maintained in a closed position to pen the animals within the enclosure while the upper two panels are opened to provide an awning and maximum ventilation to the interior. In the case of inclement weather, the panels may be closed to form a vertical wall secure against the elements.

The invention comprises three horizontally extending panels which, when closed, lie in a common vertical plane, one over the other. The lower two panels are hingedly attached and mounted at either end to two vertical posts. The upper panel is hingedly attached to a horizontal header at its upper horizontal surface.

Therefore, the device of this invention achieves versatility through three horizontal panels which may be opened individually, or the upper panel and one of the lower two may be opened as desired. The wall then provides access to the interior of the enclosure, and ventilation. The device may be quickly and efficiently opened as desired or closed to secure the interior from inclement weather.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. A sectionalized pivotal wall construction for an animal raising enclosure having a foundation, spaced vertical support posts, a horizontal roof support resting thereon, and a roof, said wall comprising:
   a first elongated rectangular panel extending between adjacent vertical support posts adjacent the foundation; first releasable locking means carried by said first panel for normally connecting each lower corner of said first panel to the enclosure;
   a second elongated rectangular panel extending between adjacent vertical support posts and disposed adjacent said first panel; second releasable locking means carried by said second panel for normally connecting each upper corner of said second panel to the adjacent support post; first hinge means connecting the adjacent upper portion of said first panel and lower portion of said second panel for permitting pivotal movement thereof from a closed position wherein both of said panels lie in a common vertical plane to an open position wherein said panels lie in adjacent vertical planes;
   a third elongated rectangular panel extending horizontally between adjacent vertical support posts and vertically between said second panel and the roof supports; second hinge means connecting the upper portion of said panel to the roof support for permitting pivotal movement thereof from a closed position wherein said third panel lies in the vertical plane containing said first and second panels to an open position wherein said third panel lies in a plane disposed at an angle to the vertical; and drive means carried by said structure for moving said third panel from a closed to an open position.

2. The wall of claim 1 wherein said drive means is mounted on the roof support and includes a lever means connected to the lower portion of said third panel for pivoting said panel about said second hinge means.

3. The wall of claim 1 wherein said drive means includes retaining means for holding said third panel in an open position.

4. The wall of claim 3 wherein said drive means comprises a shaft rotatably mounted on the roof support and extending horizontally over said third panel; link means connecting said shaft and the lower portion of said third panel for translating rotational movement of said shaft to pivotal movement of said panel about said second hinge means; and reversable means for rotating said shaft.

5. The wall of claim 4 wherein said link means further comprises at least one lever rigidly mounted on said shaft at an end thereof and extending outwardly therefrom; at least one connecting rod connected at an end thereof to a lower portion of said third panel; and at least one yoke connecting the distal portions of said lever and said rod.

6. The wall of claim 5 wherein said link means comprises a pair of levers mounted on said shaft; a pair of connecting rods attached at ends thereof to opposite sides of said panel; and a pair of yokes connecting the distal portions of each lever to the distal portion of one of said rods.

7. The wall of claim 6 wherein said shaft is rectangular in cross-sectional configuration.

8. The wall of claim 7 wherein said shaft is square in cross-sectional configuration.

9. The wall of claim 8 wherein said reversable means includes a first sprocket wheel rigidly, co-axially mounted on said shaft; a second sprocket wheel rotatably mounted on said roof support; and endless chain extending therebetween; and means for driving said second sprocket wheel.

10. The wall of claim 1 wherein said first and second locking means comprise first eye members mounted on each of the lower corners of said first panel and the upper corners of said second panel; second eye members mounted on said structure adjacent each of said first eye members; and removable pin means adapted to extend through of said first and second eye members.

* * * * *

UNITED STATES PATENT AND TRADEMARK OFFICE
CERTIFICATE OF CORRECTION

PATENT NO. : 4,162,682

DATED : July 31, 1979

INVENTOR(S) : Miller, deceased et al.

It is certified that error appears in the above-identified patent and that said Letters Patent are hereby corrected as shown below:

Column 4, line 49, change "Fig." to --Figs.--.

Column 5, after line 15, insert the language as per attachment.

Signed and Sealed this

Eighteenth Day of March 1980

[SEAL]

Attest:

SIDNEY A. DIAMOND

Attesting Officer

Commissioner of Patents and Trademarks

In a closed position, the intermediate and lower panels are locked into position by upper and lower locks disposed, respectively, at the upper opposed corners of the intermediate panel, and the lower corners of the lower corner. Adjacent corners, as noted above, are hingedly connected.

In order to open the intermediate panel, the upper locks are released and the panel rotated about the hinge connection connecting said panel and the lower panel 180°, until said intermediate panel overlaps said lower panel. The overlapping panels may then be locked together.

In the alternative, the lower panel may be rotated into an open position overlapping the intermediate panel by releasing the locking means located at either of the lower two corners and by affixing said corners when said panel has been rotated 180° to the locking means securing the upper corners of the intermediate panel.

The enclosure is preferably ventilated by opening the upper panel. The upper panel is opened and closed or held in either position by a drive means. The drive means includes a square shaft which is driven preferably by a chain drive. Rotation of the shaft is translated through a linkage to the lower portion of the upper panel. Accordingly, rotation of the shaft will raise the panel by causing the panel to rotate outwardly about a hinge connection connecting the upper surface thereof and a frame extending horizontally thereover.